United States Patent
Hosotani

(10) Patent No.: US 10,862,339 B2
(45) Date of Patent: Dec. 8, 2020

(54) POWER RECEPTION DEVICE AND POWER TRANSMISSION DEVICE

(71) Applicant: Murata Manufacturing Co., Ltd., Kyoto-fu (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 146 days.

(21) Appl. No.: 16/192,589

(22) Filed: Nov. 15, 2018

(65) Prior Publication Data

US 2019/0089199 A1    Mar. 21, 2019

Related U.S. Application Data

(63) Continuation of application No. PCT/JP2017/025704, filed on Jul. 14, 2017.

(30) Foreign Application Priority Data

Aug. 23, 2016    (JP) .................. 2016-162411

(51) Int. Cl.
*H02J 50/12* (2016.01)
*H02J 50/10* (2016.01)
*H02J 50/40* (2016.01)

(52) U.S. Cl.
CPC .............. *H02J 50/12* (2016.02); *H02J 50/10* (2016.02); *H02J 50/40* (2016.02)

(58) Field of Classification Search
CPC ...... H02J 5/005; H02J 7/00; H02J 7/02; H02J 7/025; H02J 50/12; H02J 50/40;
(Continued)

(56) References Cited

U.S. PATENT DOCUMENTS

| 2008/0197713 A1* | 8/2008 | Jin | H02J 50/60 307/104 |
| 2008/0197802 A1* | 8/2008 | Onishi | H02J 50/12 320/106 |

(Continued)

FOREIGN PATENT DOCUMENTS

| JP | H4334975 A | 11/1992 |
| JP | 200835405 A | 2/2008 |

(Continued)

OTHER PUBLICATIONS

International Search Report issued in PCT/JP2017/025704; dated Aug. 8, 2017.

(Continued)

*Primary Examiner* — Rexford N Barnie
*Assistant Examiner* — Jagdeep S Dhillon
(74) *Attorney, Agent, or Firm* — Studebaker & Brackett PC

(57) ABSTRACT

A power reception device includes a power reception coil configured to couple with a power transmission coil included in a power transmission device; a rectifier circuit including a diode and a transistor electrically connected to the power reception coil and configured to rectify a high frequency AC current flowing in the power reception coil; outputs configured to output the current rectified by the rectifier circuit to a load; a voltage detection circuit configured to detect an output voltage Va; and a controller configured to control an operation of the transistor based on the output voltage Va. The controller turns off the transistor when the output voltage Va≤the threshold value Va1 is satisfied and causes the rectifier circuit to execute a rated rectification operation, and turns on the transistor when the voltage Va≥the threshold value Va2 is satisfied and stops the rated rectification operation.

20 Claims, 14 Drawing Sheets

(58) Field of Classification Search
CPC . H02J 50/70; H01F 38/14; H04B 5/00; H04B 5/0037; H02M 3/335
USPC ............ 307/104, 149, 66, 64; 320/106, 108; 363/17, 21.02
See application file for complete search history.

(56) References Cited

U.S. PATENT DOCUMENTS

| | | | | |
|---|---|---|---|---|
| 2008/0197804 A1* | 8/2008 | Onishi | ................ | H02J 7/00045 320/108 |
| 2008/0290736 A1* | 11/2008 | Onishi | .................... | H02J 7/025 307/107 |
| 2009/0015197 A1* | 1/2009 | Sogabe | ................ | H02J 7/0034 320/108 |
| 2009/0290389 A1* | 11/2009 | Ueno | .................... | H02M 3/337 363/21.02 |
| 2011/0128758 A1* | 6/2011 | Ueno | .................... | H02M 3/335 363/17 |
| 2015/0091387 A1* | 4/2015 | Okazaki | ................. | H02J 50/60 307/104 |
| 2016/0020751 A1* | 1/2016 | Kozaki | ................ | H04B 1/0458 455/127.2 |
| 2016/0056664 A1* | 2/2016 | Partovi | ................. | B60L 53/122 307/104 |
| 2018/0198322 A1* | 7/2018 | Mercier | .................. | H02J 50/12 |

FOREIGN PATENT DOCUMENTS

| | | |
|---|---|---|
| JP | 2013-176196 A | 9/2013 |
| JP | 201512761 A | 1/2015 |
| JP | 2015202030 A | 11/2015 |
| WO | 2007/138690 A1 | 12/2007 |
| WO | 2014/132773 A1 | 9/2014 |

OTHER PUBLICATIONS

Written Opinion of The International Searching Authority issued in PCT/JP2017/025704; dated Aug. 8, 2017.
An Office Action; "Notification of Reasons for Refusal," Mailed by the Japanese Patent Office dated Jan. 7, 2020, which corresponds to Japanese Patent Application No. 2018-535517 and is related to U.S. Appl. No. 16/192,589; with English language translation.

* cited by examiner

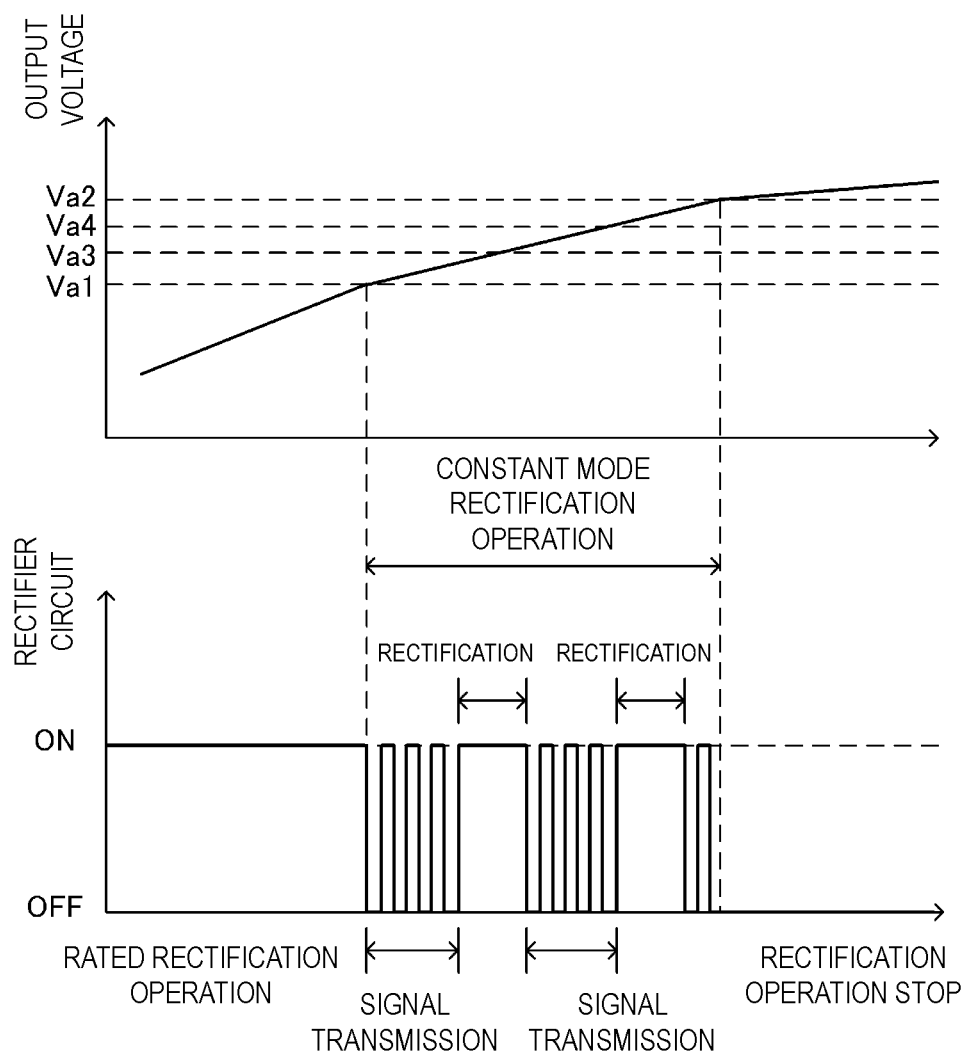

POWER TRANSMISSION DEVICE

POWER RECEPTION DEVICE

POWER TRANSMISSION DEVICE

POWER RECEPTION DEVICE

POWER RECEPTION DEVICE AND POWER TRANSMISSION DEVICE

CROSS-REFERENCE TO RELATED APPLICATIONS

This application claims benefit of priority to International Patent Application No. PCT/JP2017/025704, filed Jul. 14, 2017, and to Japanese Patent Application No. 2016-162411, filed Aug. 23, 2016, the entire contents of each are incorporated herein by reference.

BACKGROUND

Technical Field

The present disclosure relates to a power reception device which is wirelessly supplied with high frequency power from a power transmission device and the power transmission device.

Background Art

Japanese Unexamined Patent Application Publication No. 2015-12761 discloses an disclosure in which heat generation of a power reception device in a non-contact power supply system is suppressed. In the non-contact power supply system disclosed in Japanese Unexamined Patent Application Publication No. 2015-12761, power is transmitted from a power transmission device to the power reception device in a non-contact manner by resonance coupling of respective resonance circuits of the power transmission device and the power reception device. In the power reception device, power to be received is monitored, and the resonant frequency of the resonance circuit is shifted such that the power does not exceed a target power level, thereby suppressing power reception of the power equal to or higher than the target power level. Thus, the amount of heat generated in the power reception device is suppressed. Then, conversion efficiency in a power conversion circuit (for example, a DC-DC converter) in the power reception device due to the influence of the heat generation is suppressed from dropping.

SUMMARY

As an example of a power reception device, a portable device such as a smartphone or the like is cited, for example. In recent years, it has been desired to further reduce the size and thickness of such a device. However, in Japanese Unexamined Patent Application Publication No. 2015-12761, since it is necessary to provide a circuit for controlling the resonant frequency of the resonance circuit, there is a problem in that the power reception device increases in size. Therefore, when the disclosure of Japanese Unexamined Patent Application Publication No. 2015-12761 is used, there is a risk that reduction in size and thickness of the device cannot be achieved.

Accordingly, of the present disclosure provides a power reception device and a power transmission device which prevent power reception of large power and suppress heat generation without hindering miniaturization of the device.

A power reception device according to the present disclosure includes a power reception coil configured to couple with a power transmission coil included in a power transmission device; and a rectifier circuit including a rectifier element, a transistor element and a parallel capacitor, and configured to switch a conductive operation and a capacitive operation, electrically connected to the power reception coil, and configured to rectify a high frequency resonance current flowing in the power reception coil. The power reception device also includes an output unit connected to a load and configured to output a current rectified by the rectifier circuit and smoothed by a smoothing capacitor to the load; an equivalent resonance capacitor electrically connected to the power reception coil and configured to resonate with an inductance component included in the power reception coil; and a voltage detection circuit configured to detect an output voltage from the rectifier circuit. The power reception device further includes a control unit configured to control an operation of the rectifier circuit based on a detection result of the voltage detection circuit, in which the power reception coil, the rectifier circuit, and the output unit configure a power reception circuit. The smoothing capacitor has a capacitance value larger than a capacitance value of the parallel capacitor or the equivalent resonance capacitor. The control unit includes a reception power adjustment function in which in a case where a voltage detected by the voltage detection circuit is equal to or lower than a threshold value Va1, the transistor element is turned off and made to perform the capacitive operation and the rectifier circuit is made to execute a rated rectification operation. When the voltage detected by the voltage detection circuit reaches a threshold value Va2 (>Va1), the transistor element is turned on and made to perform the conductive operation, the equivalent resonance capacitor is changed to change a resonant frequency of the power reception circuit, the rated rectification operation is simultaneously stopped, and a flow of power to the output unit is stopped to stop a power receiving operation in which power is supplied from the power reception coil to the output unit.

According to this configuration, when the output voltage increases, by turning on the transistor element, the reception power can be cut off, and the influence of heat generation and the like due to the power reception of large power can be suppressed. This cutoff can be performed only by turning on the transistor element provided in the rectifier circuit. Therefore, it is not necessary to separately provide a circuit for cutting off the reception power, and miniaturization of the power reception device is not hindered.

The control unit may be configured, in a case where the voltage detected by the voltage detection circuit is higher than the threshold value Va1 and lower than the threshold value Va2, to control operation execution and stoppage of the rectifier circuit, and adjust the reception power by suppressing the output power rather than the rated rectification operation. According to this configuration, when the output voltage is high (equal to or higher than Va2), not by immediately stopping but by executing rectification for suppressing the output power rather than the rated rectification operation, it is possible to suppress transmission efficiency from dropping.

The control unit may be configured, in a case where the voltage detected by the voltage detection circuit is higher than the threshold value Va1 and lower than the threshold value Va2, to transmit a signal to the power transmission device by turning on and off the transistor element with a modulation pattern based on a digital signal transmitted to the power transmission device, and adjust the reception power by changing transmission power of the power transmission device. According to this configuration, by feeding back a state of the output voltage to the power transmission device, it is possible to cause the power transmission device side to adjust a power amount of the transmission power.

The control unit may be configured to adjust the reception power, one or more threshold values being defined between the threshold value Va1 and the threshold value Va2, in accordance with a voltage range divided by a plurality of threshold values including the threshold value Va1 and the threshold value Va2, by transmitting a signal to the power transmission device by turning on and off the transistor element with a modulation pattern based on a different digital signal. According to this configuration, by feeding back a state of the output voltage to the power transmission device, it is possible to cause the power transmission device side to adjust a power amount of the transmission power in a stepwise manner.

The parallel capacitor may be configured of a parasitic capacitance component of the transistor element. The transistor element may include a parasitic diode in parallel, and the rectifier circuit may execute a synchronous rectification operation using the transistor element and adjust the reception power. According to this configuration, it is possible to reduce a loss in the rectifier circuit.

The control unit may compare the detection result of the voltage detection circuit using a comparator, control an operation of the transistor element, and form a hysteresis between the operation execution and stoppage of the rectifier circuit. The control unit may include a Zener diode, and may control the operation of the transistor element depending on a state of whether or not the output voltage detected by the voltage detection circuit exceeds a Zener voltage.

An input capacitor may be connected to a control terminal of the transistor element, and the input capacitor may have a capacitance value smaller than a capacitance value of the smoothing capacitor and larger than a capacitance value of the parallel capacitor or the equivalent resonance capacitor.

A power transmission device according to the present disclosure includes a power transmission coil configured to couple with a power reception coil included in the power reception device; and an oscillation circuit including a transistor element electrically connected to the power transmission coil and configured to generate a high frequency AC current flowing in the power transmission coil, in which transmission power is adjusted by demodulating a modulation pattern based on a digital signal transmitted from the power reception device. According to this configuration, by adjusting transmission power by the power transmission device, it is possible to suppress the influence of the heat generation and the like due to the power reception of large power in the power reception device.

According to the present disclosure, when an output voltage increases, by turning on a transistor element, reception power can be cut off, and influence of heat generation and the like due to power reception of large power can be suppressed. This cutoff can be performed only by turning on the transistor element provided in a rectifier circuit. Therefore, it is not necessary to separately provide a circuit for cutting off the reception power, and miniaturization of a power reception device is not hindered.

BRIEF DESCRIPTION OF THE DRAWINGS

FIG. 4A and FIG. 4B are diagrams for explaining a case where the rectifier circuit is on;

FIG. 8 is a diagram illustrating a relationship between the output voltage and on/off of the rectifier circuit in a case where a transmission signal is transmitted from the power reception device to the power transmission device;

DETAILED DESCRIPTION

First Embodiment

Figure 1:
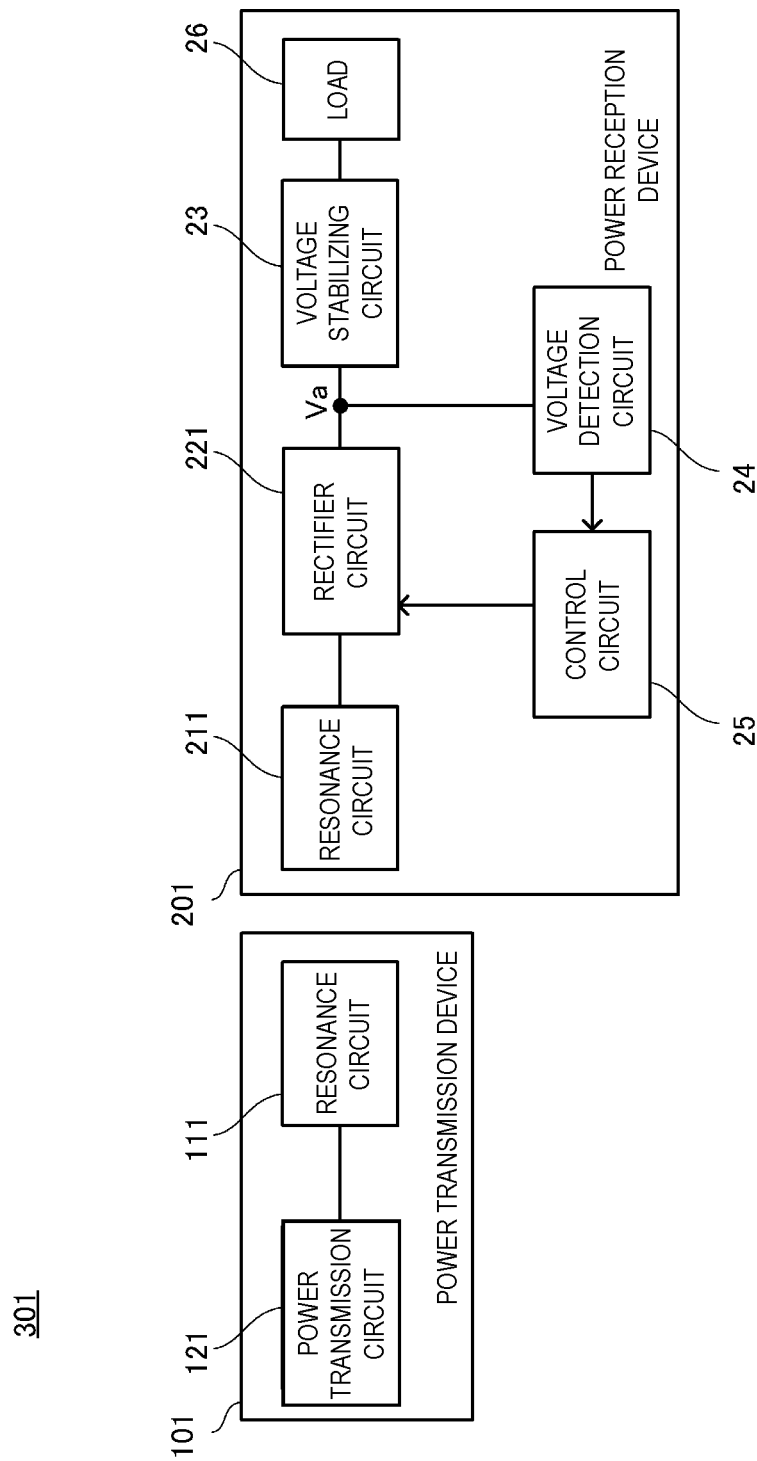
FIG. 1 is a block diagram of a wireless electric power transmission device, a wireless electric power reception device, and a wireless power supply system consisting thereof according to a first embodiment.
Figure 2:
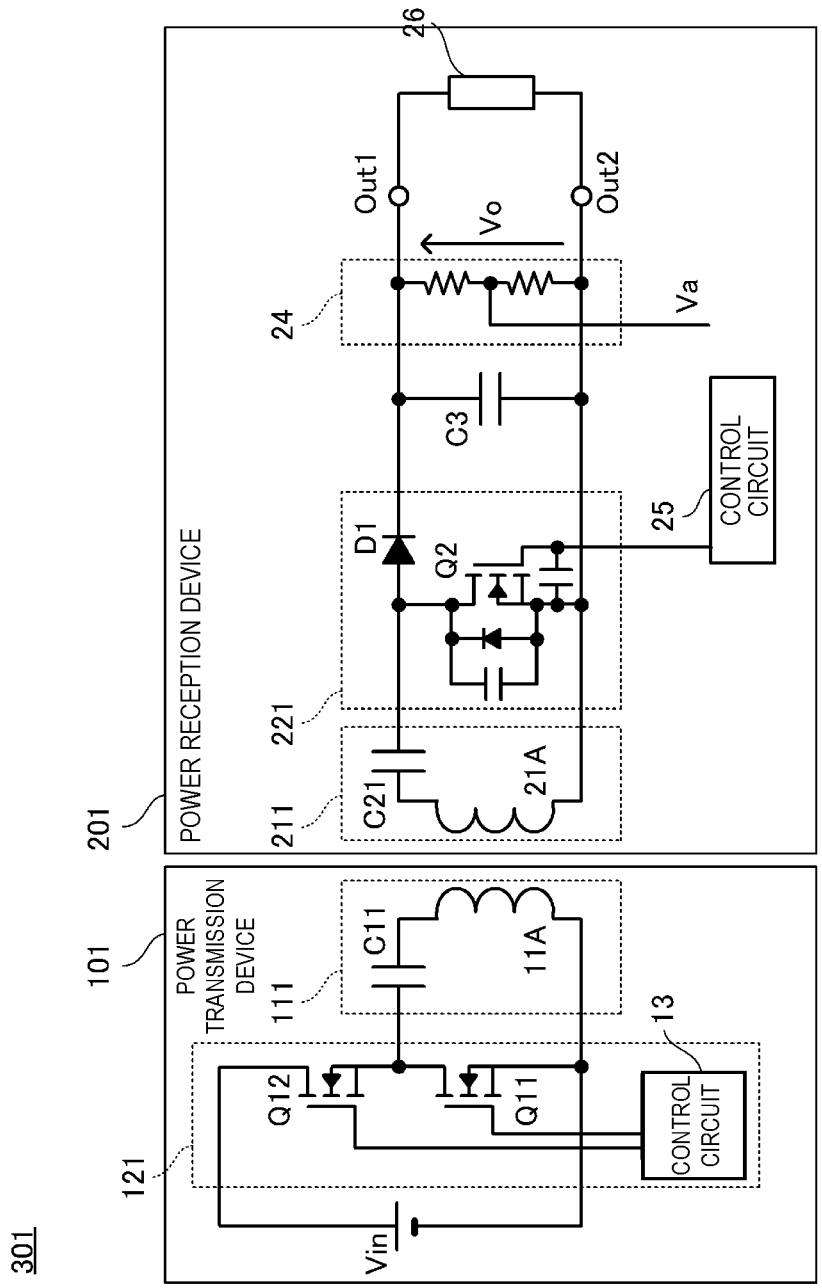
FIG. 2 is a circuit diagram of the wireless electric power transmission device and the wireless electric power reception device.

FIG. 1 is a block diagram of a wireless electric power transmission device, a wireless electric power reception device, and a wireless power supply system configured thereof according to a first embodiment. FIG. 2 is a circuit diagram of the wireless electric power transmission device and the wireless electric power reception device.

A wireless power supply system 301 is configured of a wireless electric power transmission device (hereinafter, simply referred to as a "power transmission device") 101 and a wireless electric power reception device (hereinafter, simply referred to as a "power reception device") 201. The power transmission device 101 is a power supply device which wirelessly supplies power to the power reception device 201. The power reception device 201 is, for example, a portable electronic device such as a smartphone or the like.

The power transmission device 101 includes a power transmission-side resonance circuit 111 and a power transmission circuit 121 for supplying high frequency power to the power transmission-side resonance circuit 111. The power transmission-side resonance circuit 111 includes a power transmission coil 11A and a capacitor C11. The power transmission-side resonance circuit 111 is connected to the power transmission circuit 121, and supplied with the high frequency power from the power transmission circuit 121.

The power transmission circuit 121 includes transistor elements Q11 and Q12, a control circuit 13, and the like. The control circuit 13 carries out on/off driving of the transistor elements Q11 and Q12. By the transistor elements Q11 and Q12 being subjected to transistor-control, a DC voltage from a DC power source Vin is converted into an AC voltage, and a resonance current flows in the power transmission-side resonance circuit 111.

The resonant frequency of the power transmission-side resonance circuit 111 is a frequency suitable for power supply. For example, the frequency is equal to or higher than 6 MHz and equal to or lower than 14 MHz (i.e., from 6 MHz to 14 MHz), and particularly, is 6.78 MHz, which is one of the ISM bands, for example.

In the power transmission-side resonance circuit 111, mainly between the power transmission coil 11A and the capacitor C11, magnetic field energy and electric field energy respectively included therein are exchanged, and an electric vibration is generated.

The power reception device 201 includes a power reception-side resonance circuit 211, a rectifier circuit 221, a capacitor C3 (not illustrated in FIG. 1), a voltage stabilizing circuit 23 (not illustrated in FIG. 2), a voltage detection circuit 24, a control circuit 25 and a load 26. The load 26 is, for example, a battery, and is detachably connected to output units Out1 and Out2 of the power reception device 201.

In the power reception-side resonance circuit 211, mainly between a power reception coil 21A and a capacitor C21, magnetic field energy and electric field energy respectively included therein are exchanged, and an electric vibration is generated. When these satisfy an electromagnetic field resonance condition, electromagnetic field resonance is established. By this electromagnetic field resonance, the power transmission-side resonance circuit 111 and the power reception-side resonance circuit 211 which are located apart from each other interact with each other, and the magnetic field energies and the electric field energies of the respective resonance circuits are respectively combined and exchanged with each other, and an electric vibration is generated.

The rectifier circuit 221 includes a transistor element Q2 and a diode D1, and rectifies a high frequency resonance current flowing in the power reception coil 21A. The transistor element Q2 is a MOS-FET and includes a body diode and a parallel capacitor. The transistor element Q2 is subjected to on/off driving by the control circuit 25. As will be described in detail later, when the transistor element Q2 is off, the rectifier circuit 221 performs a rated rectification operation (hereinafter, this state is referred to as an on state of the rectifier circuit 221), and when the transistor element Q2 is on, the rectifier circuit 221 stops the rectification operation (hereinafter, this state is referred to as an off state of the rectifier circuit 221).

The capacitor C3 is connected to an output side of the rectifier circuit 221. The capacitor C3 smooths a rectified voltage outputted from the rectifier circuit 221.

The voltage stabilizing circuit 23 is, for example, a DC-DC converter, and transforms the voltage rectified and smoothed by the rectifier circuit 221 and the capacitor C3 into a predetermined value, and supplies the transformed voltage to the load 26.

The voltage detection circuit 24 detects an output voltage (a voltage supplied to the load 26) Vo of the rectifier circuit 221. The voltage detection circuit 24 is, for example, a resistance voltage dividing circuit. Hereinafter, a detection voltage of the output voltage Vo detected by the voltage detection circuit 24 is represented by Va.

The control circuit 25 turns off the transistor element Q2 and makes the rectifier circuit 221 be in the on state at a normal state. The control circuit 25 turns on the transistor element Q2 when detecting that the power reception device 201 is supplied with excessive power from the power transmission device 101 by an output voltage Va which is detected by the voltage detection circuit 24, and makes the rectifier circuit 221 be in the off state. In other words, when the power reception device 201 receives large power from the power transmission device 101, the control circuit 25 cuts off the power by the rectifier circuit 221 and prevents the power from being supplied to the voltage stabilizing circuit 23. Further, by turning on the transistor element Q2, a parallel capacitor connected in parallel to the transistor element Q2 is short-circuited, and an equivalent resonance capacitor changes. By changing the resonance capacitor, a resonant frequency, in particular, an imaginary part of impedance of the power reception circuit deviates from a predetermined value, and the amplitude of the high frequency resonance current changes. When the rectification operation is stopped, decreasing of the high frequency resonance current flowing in the power reception device 201 has an effect of reducing a power loss in the power reception device 201, in particular, a conduction loss in the transistor element Q2. With this, it is possible to suppress the influence of heat generation and the like due to the power reception of large power in the power reception device 201.

The control circuit 25 performs switching from on to off of the rectifier circuit 221 on the basis of the output voltage Va detected by the voltage detection circuit 24.

Figure 3:
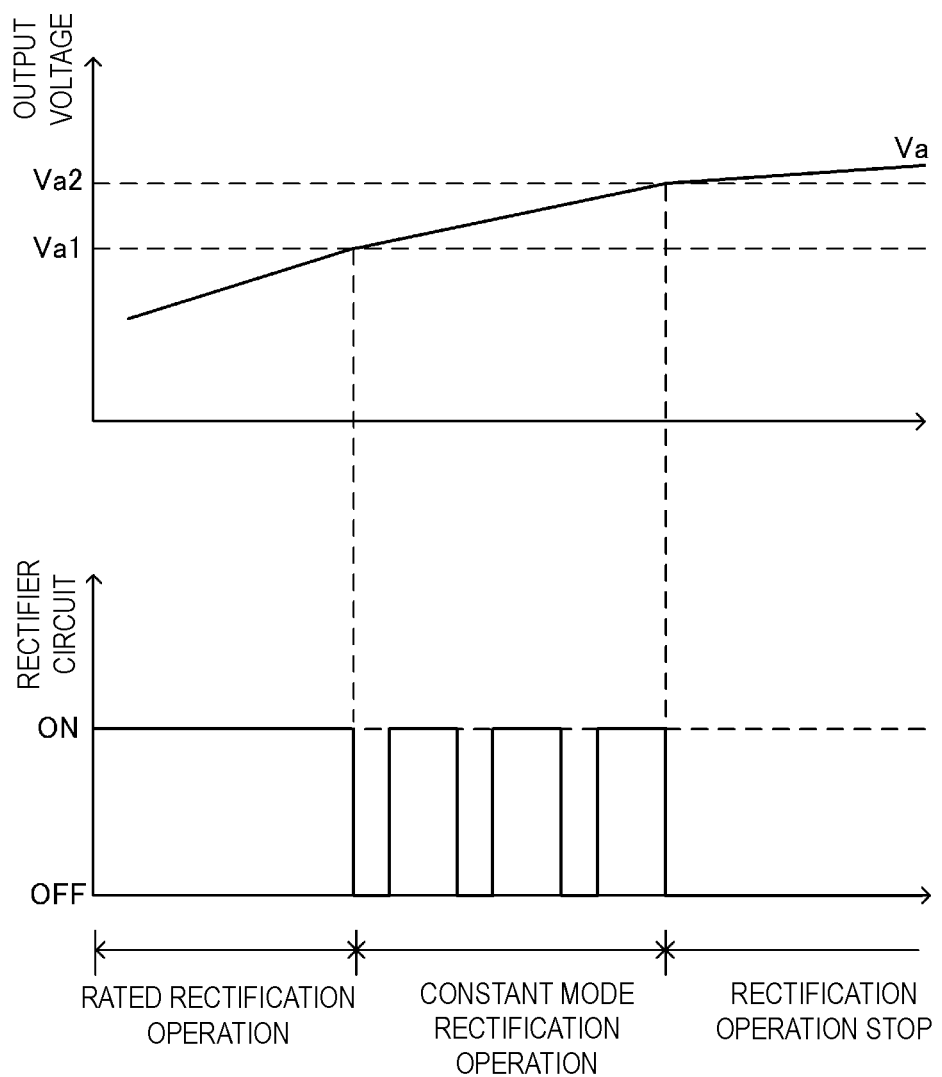
FIG. 3 is a diagram illustrating a relationship between an output voltage and on/off of a rectifier circuit.

FIG. 3 is a diagram illustrating a relationship between the output voltage Va and on/off of the rectifier circuit 221.

When the output voltage Va is equal to or lower than a threshold voltage Va1, the control circuit 25 turns off the transistor element Q2. In other words, the rectifier circuit 221 is turned on, and the rated rectification operation is executed. When the output voltage Va is equal to or higher than a threshold voltage Va2, the control circuit 25 turns on the transistor element Q2. In other words, the rectifier circuit 221 is turned off, and the rectification operation is stopped.

When the output voltage Va is higher than the threshold voltage Va1 and lower than the threshold voltage Va2, the control circuit 25 periodically turns off the transistor element Q2 of the rectifier circuit 221. In other words, the rectifier circuit 221 is alternately turned on and off. By regularly turning off the rectifier circuit 221, excessive power supply from the power transmission device 101 to the power reception device 201 can be restricted. In addition, it is possible to prevent the output voltage Va detected by the voltage detection circuit 24 from reaching the threshold voltage Va2.

Note that, a period in which the rectifier circuit 221 is turned off at this time can be changed as appropriate. Hereinafter, the rectification operation of the rectifier circuit 221 when the output voltage Va is higher than the threshold voltage Va1 and lower than the threshold voltage Va2 is referred to as a "constant mode rectification operation".

Figure 4A:
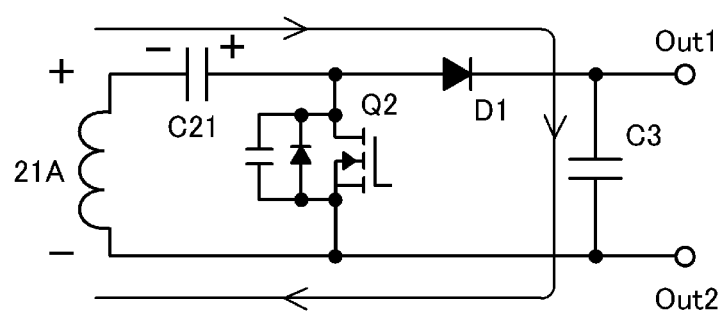
Figure 4B:
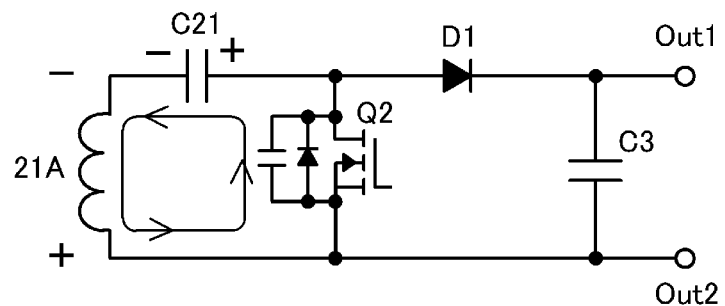

FIG. 4A and FIG. 4B are diagrams for explaining a case where the rectifier circuit 221 is on. When the rectifier circuit 221 is on, the transistor element Q2 is off.

An AC voltage is induced in the power reception coil 21A. As illustrated in FIG. 4A, when a first end of the power reception coil 21A on the capacitor C21 side becomes positive, a current flows from the power reception coil 21A through a path of the capacitor C21, the diode D1 and the capacitor C3. In this case, the capacitor C3 is charged with a voltage obtained by adding a voltage charged in the capacitor C21 to a voltage induced in the power reception coil 21A. That is, this voltage is supplied to the voltage stabilizing circuit 23.

As illustrated in FIG. 4B, when a second end of the power reception coil 21A is positive, a current flows from the power reception coil 21A to the capacitor C21 through the body diode of the transistor element Q2. Then, the capacitor C21 is charged. As described with reference to FIG. 4A, the voltage with which the capacitor C21 is charged is discharged when the first end of the power reception coil 21A becomes positive.

In the rated rectification operation, the state illustrated in FIG. 4A and the state illustrated in FIG. 4B are alternately repeated, and the voltage is outputted to the voltage stabilizing circuit 23.

Figure 5A:
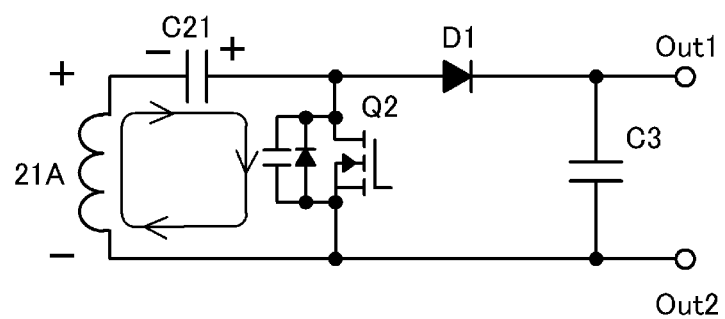
FIG. 5A and FIG. 5B are diagrams for explaining a case where the rectifier circuit is off.
Figure 5B:
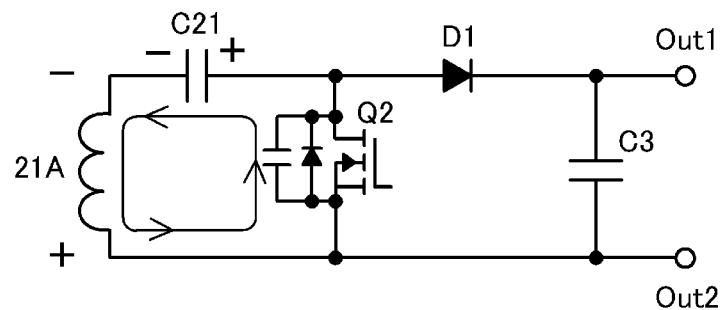

FIG. 5A and FIG. 5B are diagrams for explaining a case where the rectifier circuit 221 is off. When the rectifier circuit 221 is off, the transistor element Q2 is on.

As illustrated in FIG. 5A, when a voltage is induced in the power reception coil 21A and the first end of the power reception coil 21A becomes positive, a current flows from the power reception coil 21A through a path of the capacitor C21 and the transistor element Q2. As illustrated in FIG. 5B, when the second end of the power reception coil 21A is positive, a current flows from the power reception coil 21A to the capacitor C21 through the body diode of the transistor element Q2. When the rectification operation is stopped, the state illustrated in FIG. 5A and the state illustrated in FIG. 5B are alternately repeated. In other words, no voltage is outputted to the voltage stabilizing circuit 23.

With this, even if the power reception device 201 receives large power, by turning off the rectifier circuit 221, it is possible to cut off the power, and it is possible to suppress the influence of the heat generation and the like due to the power reception of large power in the power reception device 201. Further, since it is not necessary to provide a complicated circuit because the large power can be cut off by turning on the transistor element Q2, and it is also not necessary to secure a sufficient element installation space, the power reception device 201 can be prevented from increasing in size and can be made smaller and thinner.

Note that it is preferable that the control circuit 25 form hysteresis in a threshold value for switching the operation of the rectifier circuit 221. By providing the hysteresis, it is possible to prevent the transistor element Q2 from operating in the active region near the threshold value at which the operation of the transistor element Q2 is switched, and it is possible to suppress a large loss from being generated in the active region operation of the transistor.

Further, it is possible to clearly switch the operation execution and stoppage of the rectification operation, and thus it is possible to easily adjust the power. Additionally, it is preferable that an input capacitor be connected to a control terminal of the transistor element Q2, and the input capacitor have a capacitance value smaller than that of the capacitor C3 and larger than that of the parallel capacitor or the equivalent resonance capacitor.

By making the capacitance value of the input capacitor smaller than that of the capacitor C3 and larger than that of the parallel capacitor or the equivalent resonance capacitor, a rate of change in the operation execution and stoppage of the rectification operation can be set higher than that of change in the voltage of the smoothing capacitor and lower than that of change in the current of the high frequency resonance current. With this, while suppressing a change in the voltage of the capacitor C3, that is, a ripple voltage to be small, it is possible to prevent the transistor element Q2 from operating in the active region, and it is possible to suppress a large loss from occurring in the active region of the transistor element Q2. Further, it is possible to clearly switch the operation execution and stoppage of the rectification operation, and thus it is possible to easily adjust the power.

Hereinafter, a configuration of the control circuit 25 will be described.

Figure 6A:
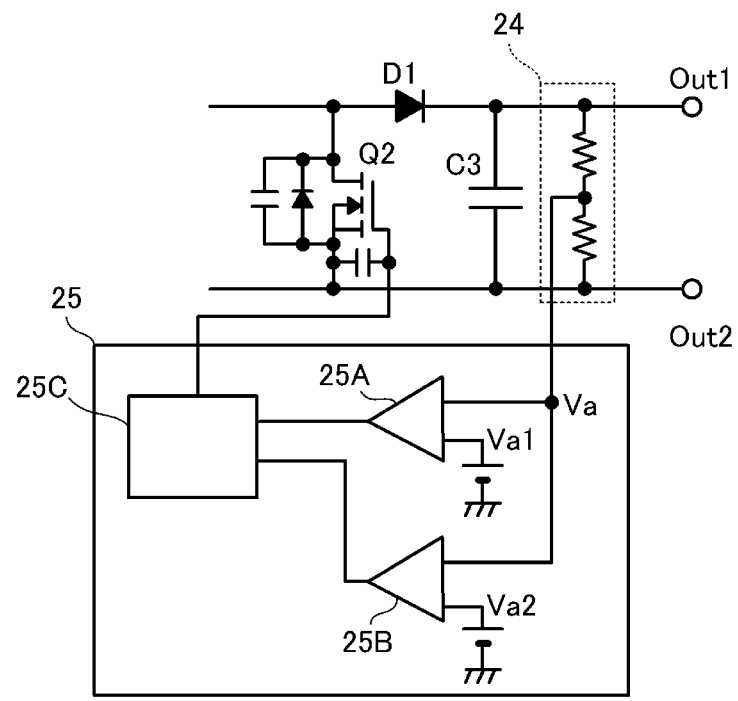
FIG. 6A is a diagram illustrating a configuration of a control circuit.
Figure 6B:
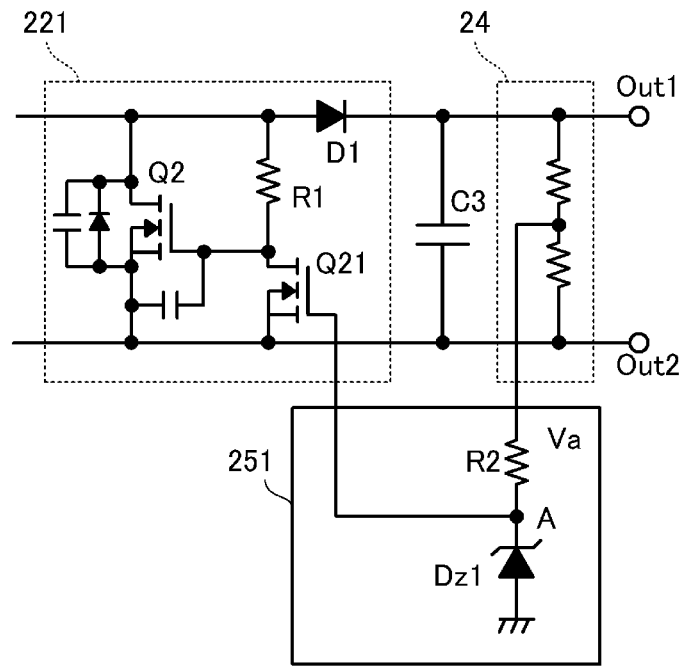
FIG. 6B is a diagram illustrating a configuration of a control circuit of another example.

FIG. 6A is a diagram illustrating the configuration of the control circuit 25, and FIG. 6B is a diagram illustrating a configuration of a control circuit of another example.

The control circuit 25 includes comparators 25A and 25B and a control unit 25C. The comparator 25A compares the output voltage Va with the threshold voltage Va1, and outputs an H level signal when Va>Va1 is satisfied. The comparator 25B compares the output voltage Va with the threshold voltage Va2, and outputs an H level signal when Va>Va2 is satisfied.

The control unit 25C outputs a gate signal to the transistor element Q2 on the basis of the output signals of the comparators 25A and 25B. Specifically, when the output signals of the comparators 25A and 25B are both "Lo", that is, when Va<Va1 is satisfied, the control unit 25C turns off the transistor element Q2. When the output signal of the comparator 25A is "Hi" and the output signal of the comparator 25B is "Lo", that is, when Va1<Va<Va2 is satisfied, the control unit 25C outputs a pulse signal to a gate of the transistor element Q2 and turns on/off the transistor element Q2. When the output signals of the comparators 25A and 25B are both "Hi", that is, when Va2<Va is satisfied, the control unit 25C turns on the transistor element Q2.

Note that the control circuit 25 may have a configuration illustrated in FIG. 6B. In this case, the rectifier circuit 221 includes a series circuit of a resistor R1 and a transistor element Q21 for driving the transistor element Q2. A connection point between the resistor R1 and the transistor element Q21 is connected to the gate of the transistor element Q2.

A control circuit 251 illustrated in FIG. 6B has a series circuit of a resistor R2 and a Zener diode Dz1. This series circuit is connected to the voltage detection circuit 24. Further, a connection point A between the resistor R2 and the Zener diode Dz1 is connected to a gate of the transistor element Q21.

In this configuration, when the output voltage Va is lower than a Zener voltage of the Zener diode Dz1, a potential of the connection point A is "Hi", and the transistor element Q21 is turned on. Then, a potential at the connection point between the resistor R1 and the transistor element Q21 is "Lo", and the transistor element Q2 is turned off. When the output voltage Va increases and exceeds the Zener voltage, the potential of the connection point A becomes "Lo", the transistor element Q21 is turned off, and the transistor element Q2 is turned on. The Zener voltage is set such that, when the output voltage Va is equal to or lower than the threshold voltage Va1, the transistor element Q2 is turned off.

When the output voltage Va exceeds the Zener voltage and the transistor element Q2 is turned on, the rectifier circuit 221 is off. At this time, the capacitor C3 discharges, and the output voltage Va decreases. When the output voltage Va becomes lower than the Zener voltage, the potential at the connection point A becomes "Hi", and the transistor element Q2 is turned off again. The rectifier circuit 221 is on. Then, when the output voltage Va exceeds the Zener voltage again, the transistor element Q2 is turned on and the rectifier circuit 221 is turned off. By repeating this operation, the above-described constant mode rectification operation is executed.

When the output voltage Va is sufficiently high (equal to or higher than the threshold voltage Va2), the transistor element Q2 is turned on, and the rectifier circuit 221 is turned off. Then, until the output voltage Va becomes lower than the Zener voltage, the rectifier circuit 221 remains off, and the rectification operation is stopped.

Note that the comparison between the output voltage Va and the threshold voltages Va1 and Va2 may be performed by digital processing. Further, the values of the threshold voltages Va1 and Va2 can be changed as appropriate.

Figure 7:
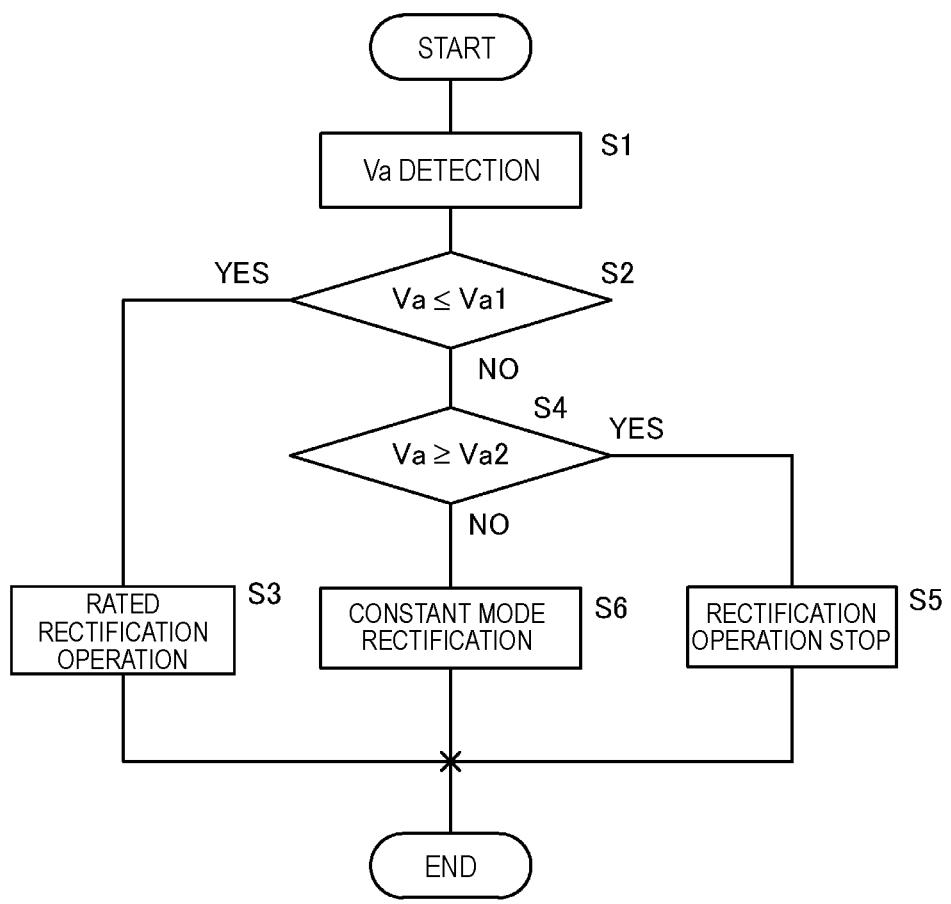
FIG. 7 is a flowchart illustrating an operation executed by the power reception device.

FIG. 7 is a flowchart illustrating an operation executed by the power reception device 201.

When power transmission is performed from the power transmission device 101, the power reception device 201 detects the output voltage Va with the voltage detection circuit 24 (S1). When the output voltage Va is equal to or lower than the threshold voltage Va1 (S2: YES), the control circuit 25 turns off the transistor element Q2 and turns on the rectifier circuit 221, that is, the rated rectification operation by the rectifier circuit 221 is executed (S3).

When the output voltage Va is not equal to or lower than the threshold voltage Va1 (S2: NO), and the output voltage Va is equal to or higher than the threshold voltage Va2 (S4: YES), the control circuit 25 turns on the transistor element Q2 and turns off the rectifier circuit 221, that is, the rectification operation by the rectifier circuit 221 is stopped (S5).

When the output voltage Va does not reach the threshold voltage Va2 (S4: NO), that is, when Va1<Va<Va2 is satisfied, the control circuit 25 alternately turns on and off the transistor element Q2, and the constant mode rectification operation by the rectifier circuit 221 is executed (S6).

As described above, when the output voltage Va exceeds the threshold voltage Va2, by turning off the rectifier circuit 221 and stopping the flow of the power to the load 26, it is possible to suppress the influence of the heat generation and the like due to the power reception of large power. Since the reception power can be independently cut off on the side of the power reception device 201, it is not necessary to feed back the state of the reception power from the power reception device 201 to the power transmission device 101. Further, when the output voltage Va becomes high, not by immediately stopping the rectifier circuit 221 but by executing the constant mode rectification operation, it is possible to suppress the transmission efficiency from dropping.

Note that, when executing the constant mode rectification operation, predetermined information (transmission signal), such as information relating to the load supply voltage or the like, may be transmitted from the power reception device 201 to the power transmission device 101.

By turning on/off the transistor element Q2, the rectifier circuit 221 is switched between on and off, and the power supply and cutoff of the load can be switched. By this switching, an impedance when viewing the power reception device 201 from the power transmission device 101 changes. The power transmission device 101 converts the change in the impedance into signals of "0" and "1", and reads the predetermined information transmitted from the power reception device 201.

FIG. 8 is a diagram illustrating a relationship between the output voltage Va and on/off of the rectifier circuit 221 in a case where the transmission signal is transmitted from the power reception device 201 to the power transmission device 101.

The operation of the rectifier circuit 221 in the case where the output voltage Va is equal to or lower than the threshold voltage Va1 and the case where the output voltage Va is equal to or higher than the threshold voltage Va2 is the same as that in FIG. 3.

When the output voltage Va is higher than the threshold voltage Va1 and lower than the threshold voltage Va2, the control circuit 25 periodically turns off the rectifier circuit 221. During this off period, the control circuit 25 turns on/off the transistor element Q2, and changes the impedance when viewing the power reception device 201 from the power transmission device 101. Then, in accordance with the output voltage Va (Va1<Va<Va2), information relating to the load supply voltage is transmitted from the power reception device 201 to the power transmission device 101 in three stages.

For example, when the output voltage Va is lower than a threshold voltage Va3 (>Va1), first information (for example, a content indicating that the voltage Va has exceeded the voltage Va1) is transmitted from the power reception device 201 to the power transmission device 101. When the output voltage Va is equal to or higher than the threshold voltage Va3 and lower than a threshold voltage Va4 (>Va3), second information (for example, a content indicating that the voltage Va approaches the voltage Va2) is transmitted from the power reception device 201 to the power transmission device 101. When the output voltage Va is equal to or higher than the threshold voltage Va4 and lower than the threshold voltage Va2, third information (for example, a content indicating that the voltage Va is just before exceeding the voltage Va2) is transmitted from the power reception device 201 to the power transmission device 101.

The control circuit 25 changes the transmission signal by changing the on period of the rectifier circuit 221 (that is, the off period of the transistor element Q2).

Figure 9A:
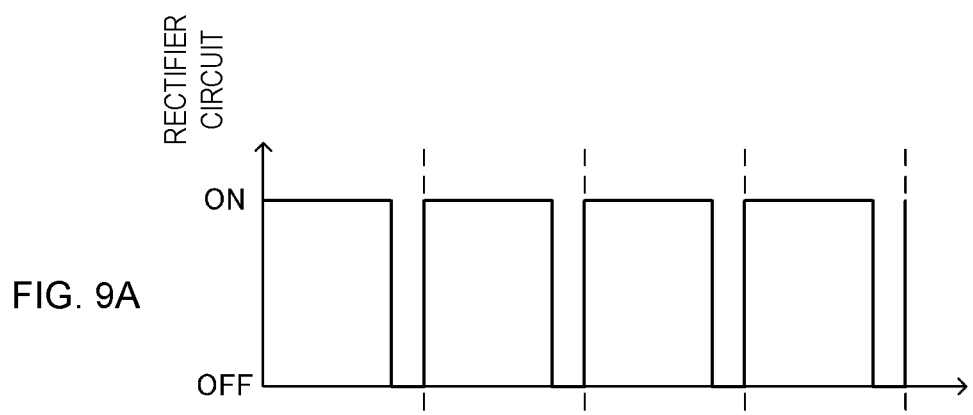
FIG. 9A, FIG. 9B and FIG. 9C are diagrams illustrating on/off patterns of the rectifier circuit when the transmission signal is transmitted.
Figure 9B:
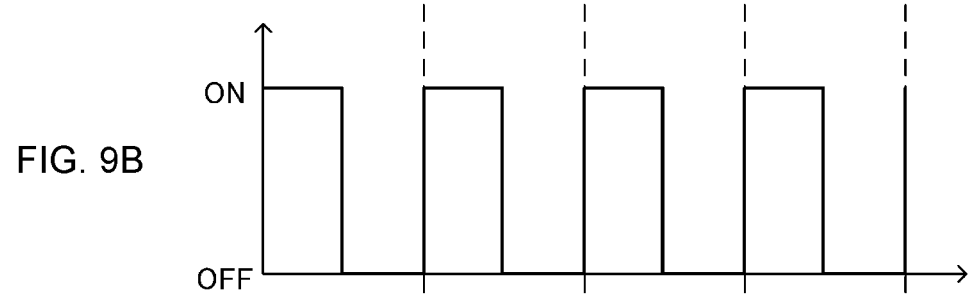
Figure 9C:
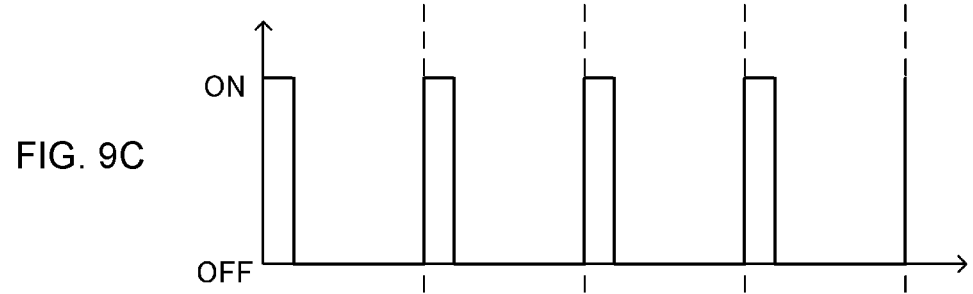

FIG. 9A, FIG. 9B and FIG. 9C are diagrams illustrating on/off patterns of the rectifier circuit 221 when the transmission signal is transmitted.

FIG. 9A illustrates the on/off pattern of the rectifier circuit 221 when the first information is transmitted. FIG. 9B illustrates the on/off pattern of the rectifier circuit 221 when the second information is transmitted. FIG. 9C illustrates the on/off pattern of the rectifier circuit 221 when the third information is transmitted. By changing the on period and the off period of the rectifier circuit 221 in this manner, different signals (in this example, three kinds of signals) can be transmitted from the power reception device 201 to the power transmission device 101. Note that the transmission of the signal may be performed using a PCM method.

The control circuit 13 of the power transmission device 101 (see FIG. 2) determines a change in an input impedance when viewing the load side from the power transmission circuit 121 (that is, an input impedance at a switching frequency when viewing the power reception side from the power transmission side), and demodulates a change pattern of the determination result per a constant period of time in temporal change into a transmission signal. On the basis of the demodulated transmission signal, the control circuit 13 turns on/off the transistor elements Q11 and Q12 to appropriately adjust a power amount of the transmission power.

Figure 10:
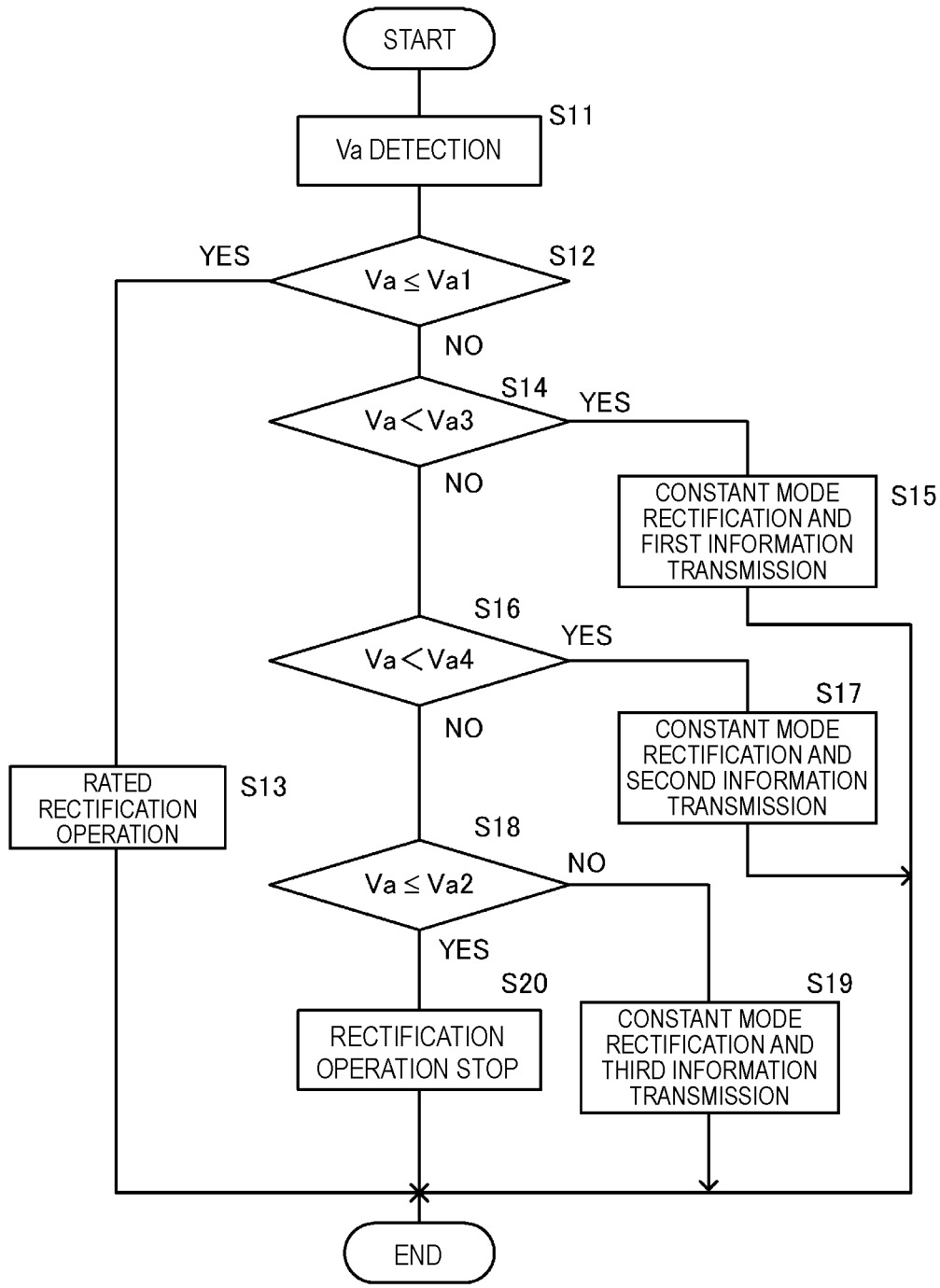
FIG. 10 is a flowchart illustrating an operation executed by the power reception device.

FIG. 10 is a flowchart illustrating an operation executed by the power reception device 201. Note that when the control circuit 25 has a CPU and performs the on/off control of the rectifier circuit 221 by the digital processing, the processing illustrated in FIG. 10 is executed by the control circuit 25.

When power transmission is performed from the power transmission device 101, the power reception device 201 detects the output voltage Va with the voltage detection circuit 24 (S11). When the output voltage Va is equal to or lower than the threshold voltage Va1 (S12: YES), the control circuit 25 turns off the transistor element Q2 and turns off the rectifier circuit 221, that is, the rated rectification operation by the rectifier circuit 221 is executed (S13).

When the output voltage Va is not equal to or lower than the threshold voltage Va1 (S2: NO) and the output voltage Va is lower than the threshold voltage Va3 (S14: YES), the control circuit 25 transmits, while executing the constant mode rectification operation by repeatedly turning on/off the transistor element Q2, the first information from the power reception device 201 to the power transmission device 101 (S15).

When the output voltage Va is not lower than the threshold voltage Va3 (S14: NO) and the output voltage Va is lower than the threshold voltage Va4 (S16: YES), the control circuit 25 transmits, while executing the constant mode rectification operation, the second information from the power reception device 201 to the power transmission device 101 (S17).

When the output voltage Va is not lower than the threshold voltage Va4 (S16: NO) and the output voltage Va is equal to or lower than the threshold voltage Va2 (S18: YES), the control circuit 25 transmits, while executing the constant mode rectification operation, the third information from the power reception device 201 to the power transmission device 101 (S19).

When the output voltage Va is not equal to or lower than the threshold voltage Va2 (S18: NO), the control circuit 25 turns on the transistor element Q2 and turns on the rectifier circuit 221, that is, the rectification operation by the rectifier circuit 221 is stopped (S20).

As described above, by transmitting the signal from the power reception device 201 to the power transmission device 101 before the output voltage Va exceeds the threshold voltage Va2, the power transmission device 101 can grasp the power reception state of the power reception device 201. As a result, it may be possible to avoid that the output voltage Va exceeds the threshold voltage Va2. Further, even if the transmission power cannot be adjusted on the side of the power transmission device 101, since the reception power can be cut off by the power reception device 201, it is possible to suppress the influence of the heat generation and the like due to the power reception of large power.

Note that the circuit configuration of the power reception device 201 is not limited to the above-described configuration.

Figure 11:
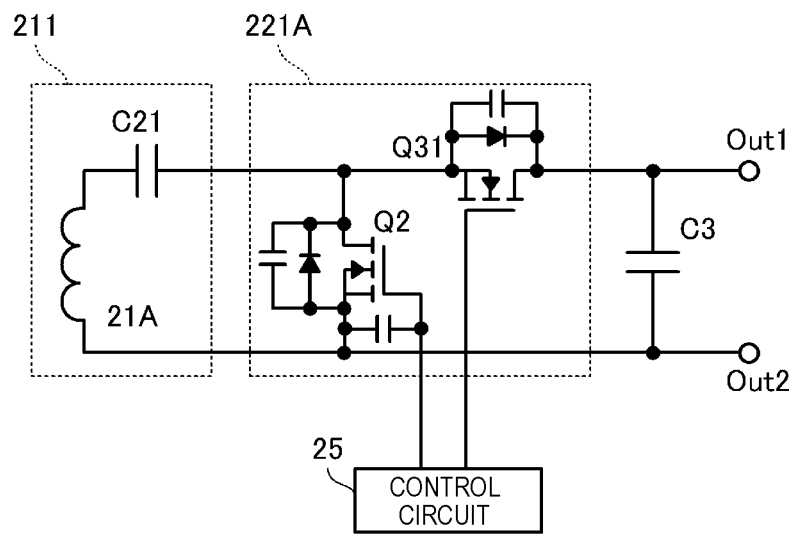
FIG. 11 is a circuit diagram of another example of the power reception device.
Figure 12:
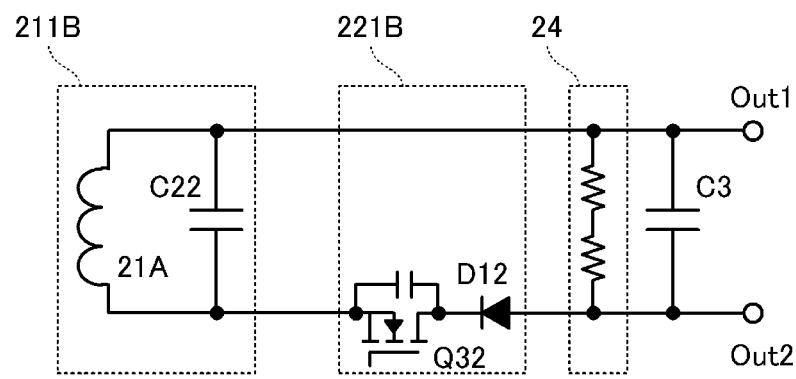
FIG. 12 is a circuit diagram of another example of the power reception device.

FIG. 11 and FIG. 12 are circuit diagrams of other examples of the power reception device.

A power reception device 201A illustrated in FIG. 11 includes a synchronous rectifier circuit 221A. The synchronous rectifier circuit 221A includes a transistor element Q31 instead of the diode D1 of the rectifier circuit 221 described with reference to FIG. 2. The transistor element Q31 is, for example, a MOS-FET. The transistor elements Q2 and Q31 are each subjected to switching control by the control circuit 25.

The control circuit 25 performs switching control of the transistor elements Q2 and Q31 at a predetermined cycle such that the operation described in FIG. 4A and FIG. 4B is performed. To be specific, by the control circuit 25 turning off the transistor element Q2 and turning on the transistor element Q31, the state illustrated in FIG. 4A is obtained. Further, by the control circuit 25 turning on the transistor element Q2 and turning off the transistor element Q31, the state illustrated in FIG. 4B is obtained. In this case, compared with the configuration illustrated in FIG. 2, it is possible to reduce the loss in the rectifier circuit 221.

A power reception device 201B illustrated in FIG. 12 includes a power reception-side resonance circuit 211B and a rectifier circuit 221B. The power reception-side resonance circuit 211B is a parallel resonance circuit of the power reception coil 21A and a capacitor C22. The rectifier circuit 221B has a configuration in which a transistor element Q32 and a diode D12 are connected in series. The rectifier circuit 221B performs rectification operation when a transistor element Q4 is turned on, and stops the rectification operation, that is, cuts off voltage supply to the voltage stabilizing circuit 23 (FIG. 1) when the transistor element Q32 is turned off.

(Variation)

Hereinafter, variations on the wireless power supply system in which the power transmission devices and the power reception devices respectively have different circuit configurations will be described.

FIG. 13, FIG. 14, FIG. 15, FIG. 16 and FIG. 17 are circuit diagrams of wireless power supply systems of other examples.

Figure 13:
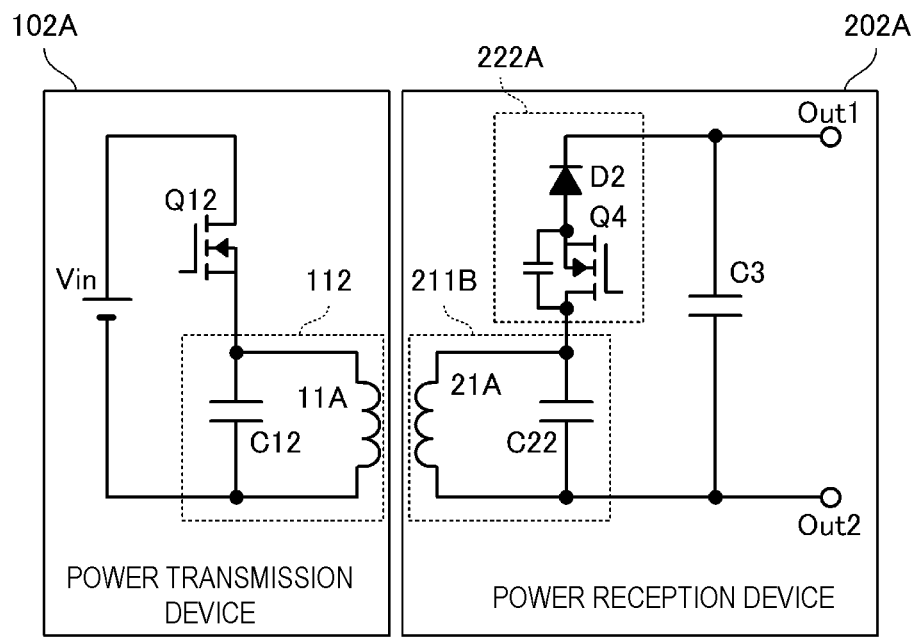
FIG. 13 is a circuit diagram of a wireless power supply system of another example.

A wireless power supply system 302A illustrated in FIG. 13 includes a power transmission device 102A and a power reception device 202A.

The power transmission device 102A includes a power transmission-side resonance circuit 112 of the power transmission coil 11A and a capacitor C12, and the transistor element Q12 that supplies a DC voltage from the DC power source Vin to the resonance circuit. The transistor element Q12 is turned on/off with a switching frequency which is made to be equal to the resonant frequency of the resonance circuit. By turning on/off the transistor element Q12, the capacitor C12 repeats charging and discharging, and an AC voltage is applied to the power transmission coil 11A.

The power reception device 202A includes the power reception-side resonance circuit 211B, a rectifier circuit 222A and the capacitor C3. Note that, although not illustrated in the drawing, the power reception device 202A includes the voltage stabilizing circuit, the voltage detection circuit, the control circuit, and the like.

The power reception-side resonance circuit 211B is a parallel resonance circuit of the power reception coil 21A and the capacitor C22. The rectifier circuit 222A is a series circuit of the transistor element Q4 and a diode D2. The transistor element Q4 is subjected to switching control by the control circuit, which is not illustrated.

In this configuration, by turning on the transistor element Q4, the rectifier circuit 222A performs the rectification operation, and by turning off the transistor element Q4, the rectifier circuit 222A stops the rectification operation, and cuts off the received power.

Figure 14:
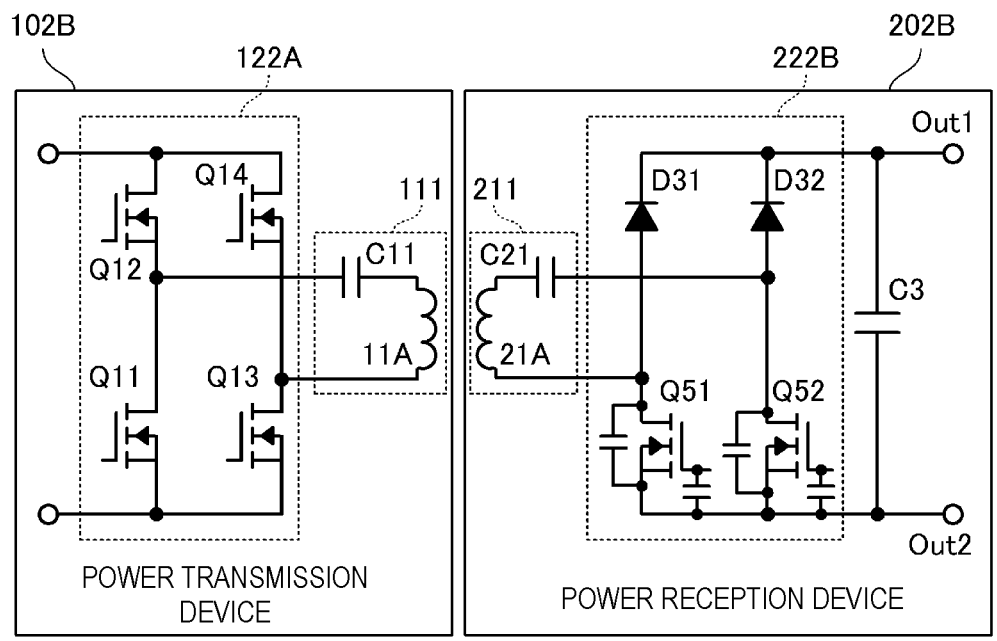
FIG. 14 is a circuit diagram of a wireless power supply system of another example.

A wireless power supply system 302B illustrated in FIG. 14 includes a power transmission device 102B and a power reception device 202B.

The power transmission device 102B includes the power transmission-side resonance circuit 111 and a power transmission circuit 122A. The power transmission circuit 122A is configured by connecting a series circuit of the transistor elements Q11 and Q12 and a series circuit of transistor elements Q13 and Q14 in parallel with each other. By the transistor elements Q11 and Q14 and the transistor elements Q12 and Q13 being alternately turned on and off, a DC voltage from the DC power source Vin is converted into an AC voltage, and the resulting voltage is supplied to the power transmission-side resonance circuit 111.

The power reception device 202B includes the power reception-side resonance circuit 211, a rectifier circuit 222B and the capacitor C3. Note that, although not illustrated in the drawing, the power reception device 202B includes the voltage stabilizing circuit, the voltage detection circuit, the control circuit, and the like.

The rectifier circuit 222B is configured by connecting a series circuit of a transistor element Q51 and a diode D31 and a series circuit of a transistor element Q52 and a diode D32 in parallel with each other. The transistor elements Q51 and Q52 are subjected to switching control by the control circuit, which is not illustrated.

The power reception-side resonance circuit 211 is connected to a connection point between the transistor element Q51 and the diode D31 and a connection point between the transistor element Q52 and the diode D32. As illustrated in FIG. 4A, when the first end of the power reception coil 21A on the capacitor C21 side is positive, the transistor element Q51 is turned on and the transistor element Q52 is turned off. With this, a current path of the power reception coil 21A, the capacitor C21, the diode D32 and the capacitor C3 is formed.

As illustrated in FIG. 4B, when the second end of the power reception coil 21A is positive, the transistor element Q51 is turned off and the transistor element Q52 is turned on. With this, a current path of the power reception coil 21A, the diode D31, the capacitor C3, the transistor element Q52 and the capacitor C21 is formed.

In this configuration, by turning off the transistor elements Q51 and Q52, the rectifier circuit 222B stops the rectification operation, and cuts off the received power.

Figure 15:
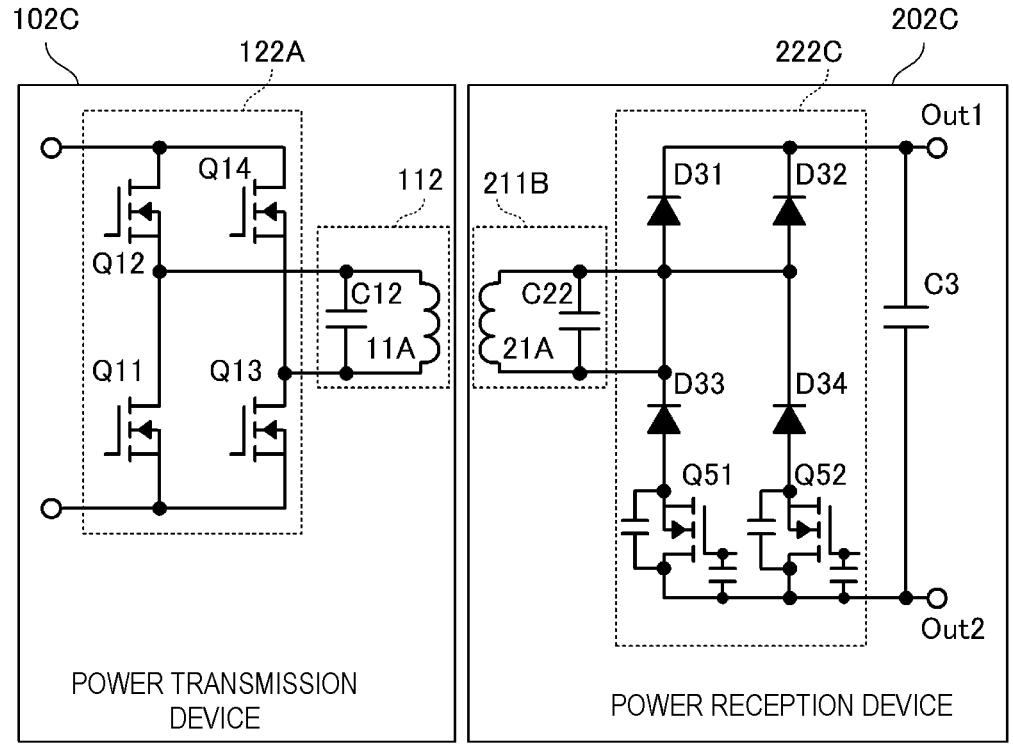
FIG. 15 is a circuit diagram of a wireless power supply system of another example.

A wireless power supply system 302C illustrated in FIG. 15 includes a power transmission device 102C and a power reception device 202C. The power transmission device 102C includes the power transmission-side resonance circuit 112 and the power transmission circuit 122A.

The power reception device 202C includes the power reception-side resonance circuit 211B, a rectifier circuit 222C and the capacitor C3. Note that, although not illustrated in the drawing, the power reception device 202C includes the voltage stabilizing circuit, the voltage detection circuit, the control circuit, and the like.

The rectifier circuit 222C is configured by connecting a series circuit of the transistor element Q51 and the diode D31 and a diode D33 and a series circuit of the transistor element Q52 and the diode D32 and a diode D34 in parallel with each other. The transistor elements Q51 and Q52 are subjected to switching control by the control circuit, which is not illustrated.

The control of the transistor elements Q51 and Q52 is the same as that of FIG. 14. In other words, by turning off the transistor elements Q51 and Q52, the rectifier circuit 222B stops the rectification operation and cuts off the received power.

Figure 16:
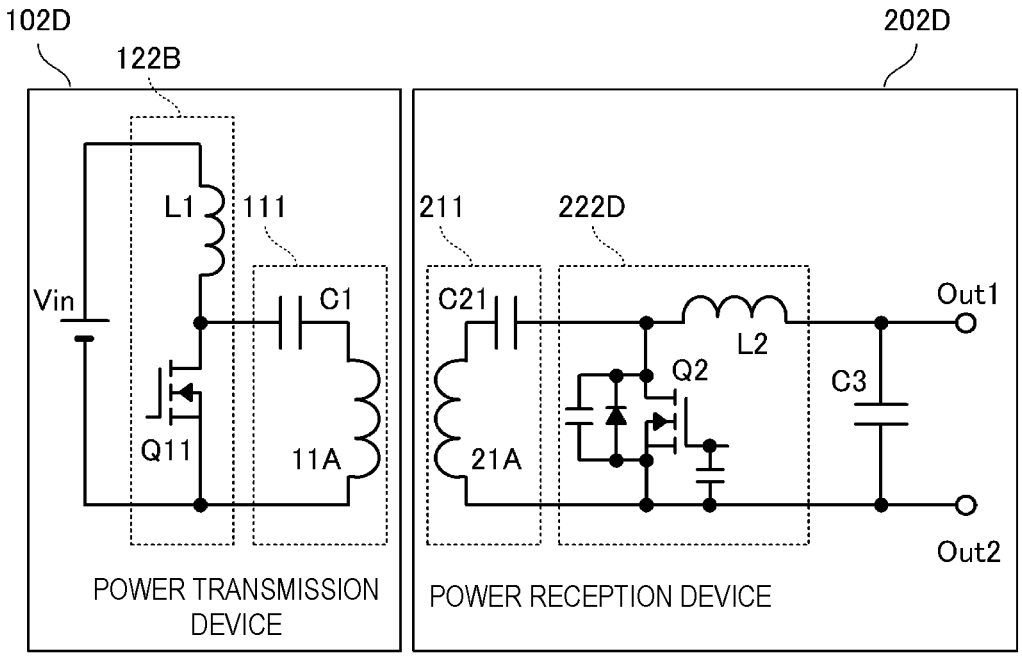
FIG. 16 is a circuit diagram of a wireless power supply system of another example.

A wireless power supply system 302D illustrated in FIG. 16 includes a power transmission device 102D and a power reception device 202D.

The power transmission device 102D includes the power transmission-side resonance circuit 111 and a power transmission circuit 122B. The power transmission circuit 122B includes the transistor element Q11 and an inductor L1, and generates an AC current that flows in the power transmission coil 11A. The inductor L1 has an inductance value of a size capable of generating a current source which can be regarded as a DC current relative to the AC current flowing in the power transmission coil 11A from an inputted DC voltage. The inductance value of the inductor L1 is sufficiently larger than the inductance value of the power transmission coil 11A and to be a high impedance at the switching frequency, and the fluctuation in the flowing current is sufficiently small.

The power reception device 202D includes the power reception-side resonance circuit 211, a rectifier circuit 222D and the capacitor C3. Note that, although not illustrated in the drawing, the power reception device 202D includes the voltage stabilizing circuit, the voltage detection circuit, the control circuit, and the like.

The rectifier circuit 222D includes an inductor L2 instead of the diode D1 of the rectifier circuit 221 illustrated in FIG. 2.

In this configuration, by turning on the transistor element Q2, the rectifier circuit 222D performs the rectification operation, and by turning off the transistor element Q2, the rectifier circuit 222D stops the rectification operation and cuts off the received power.

Figure 17:
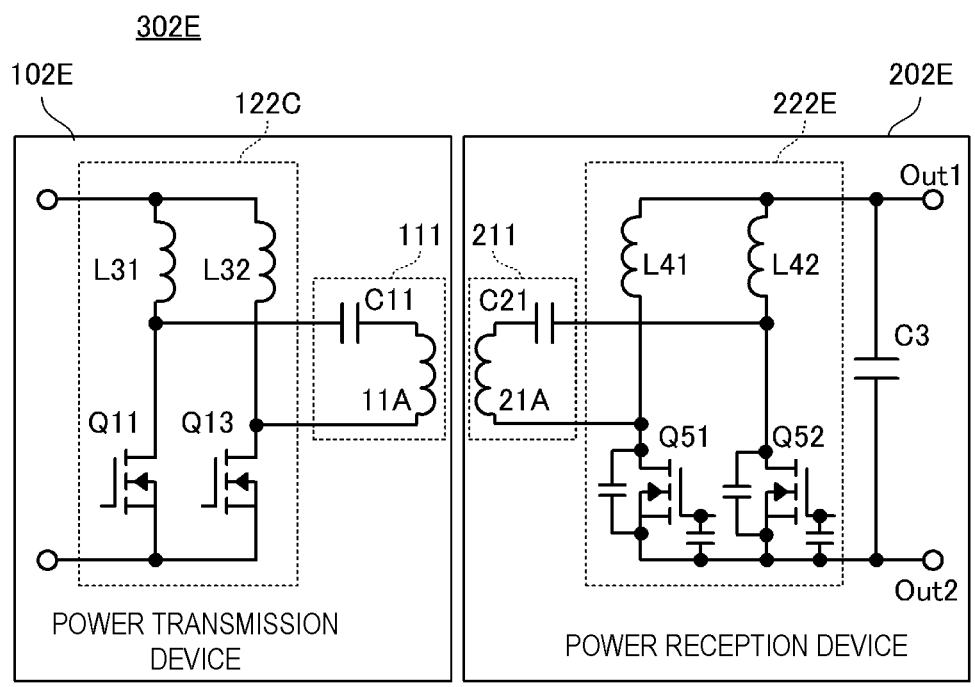
FIG. 17 is a circuit diagram of a wireless power supply system of another example.

A wireless power supply system 302E illustrated in FIG. 17 includes a power transmission device 102E and a power reception device 202E.

The power transmission device 102E includes the power transmission-side resonance circuit 111 and a power transmission circuit 122C. The power transmission circuit 122C includes inductors L31 and L32 instead of the transistor elements Q12 and Q14 of the power transmission circuit 122A illustrated in FIG. 14. The power transmission circuit 122C turns on/off the transistor elements Q12 and Q14, and generates an AC current that flows in the power transmission coil 11A.

The inductors L31 and L32 each have an inductance value of a size capable of generating a current source which can be regarded as a DC current relative to the AC current flowing in the power transmission coil 11A from an inputted DC voltage. The inductance value of each of the inductors L31 and L32 is sufficiently larger than the inductance value of the power transmission coil 11A and to be a high impedance at the switching frequency, and the fluctuation in the flowing current is sufficiently small.

The power reception device 202E includes the power reception-side resonance circuit 211, a rectifier circuit 222E and the capacitor C3. Note that, although not illustrated in the drawing, the power reception device 202E includes the voltage stabilizing circuit, the voltage detection circuit, the control circuit, and the like.

The rectifier circuit 222E includes inductors L41 and L42 instead of the diodes D31 and D32 of the rectifier circuit 222B illustrated in FIG. 14.

In this configuration, by turning on/off the transistor elements Q51 and Q52, as described with reference to FIG. 14, the rectifier circuit 222E performs the rectification operation, or stops the rectification operation and cuts off the received power.

In the configurations of the wireless power supply systems illustrated in FIG. 13 to FIG. 17 as well, since the reception power can be independently cut off on the power reception device side, it is possible to suppress the influence of the heat generation and the like due to the power reception of large power.

Note that the respective combinations of the power transmission devices and the power reception devices illustrated in FIG. 13 to FIG. 17 can be changed as appropriate. For example, a wireless power supply system may be configured by combining the power transmission device 102A illustrated in FIG. 13 and the power reception device 202A illustrated in FIG. 14.

What is claimed is:

1. A power reception device comprising:
   a power reception coil configured to couple with a power transmission coil included in a power transmission device;
   a rectifier circuit including a rectifier, a transistor and a parallel capacitor, the rectifier circuit being configured to switch a conductive operation and a capacitive operation, electrically connected to the power reception coil, and configured to rectify a high frequency resonance current flowing in the power reception coil;
   an output connected to a load and configured to output a current rectified by the rectifier circuit and smoothed by a smoothing capacitor to the load;
   an equivalent resonance capacitor electrically connected to the power reception coil and configured to resonate with an inductance component included in the power reception coil;
   a voltage detection circuit configured to detect an output voltage from the rectifier circuit; and
   a controller configured to control an operation of the rectifier circuit based on a detection result of the voltage detection circuit,
   wherein
   the power reception coil, the rectifier circuit, and the output unit configure a power reception circuit, the smoothing capacitor has a capacitance value larger than a capacitance value of the parallel capacitor or the equivalent resonance capacitor, and
   the controller includes
   a reception power adjustment function in which in a case where a voltage detected by the voltage detection circuit is equal to or lower than a threshold value Va1, the transistor is turned off and performs the capacitive operation and the rectifier circuit executes a rated rectification operation; and in a case where the voltage detected by the voltage detection circuit reaches a threshold value Va2 (>Va1), the transistor is turned on and performs the conductive operation, the equivalent resonance capacitor is changed to change a resonant frequency of the power reception circuit, the rated rectification operation is simultaneously stopped, and a flow of power to the output is stopped to stop a power receiving operation in which power is supplied from the power reception coil to the output; and
   a function to compare the detection result of the voltage detection circuit using a comparator and control the operation of the transistor between the operation execution and stoppage of the rectification operation.

2. The power reception device according to claim 1, wherein
   the controller controls, in a case where the voltage detected by the voltage detection circuit is higher than the threshold value Va1 and lower than the threshold value Va2, operation execution and stoppage of the rectifier circuit, and adjusts reception power by suppressing output power in comparison with the rated rectification operation.

3. The power reception device according to claim 1, wherein
   the controller transmits, in a case where the voltage detected by the voltage detection circuit is higher than the threshold value Va1 and lower than the threshold value Va2, a signal to the power transmission device by turning on and off the transistor element with a modulation pattern based on a digital signal transmitted to the power transmission device, and adjusts the reception power by changing transmission power of the power transmission device.

4. The power reception device according to claim 3, wherein
   the controller adjusts the reception power, one or more threshold values being defined between the threshold value Va1 and the threshold value Va2, in accordance with a voltage range divided by a plurality of threshold values including the threshold value Va1 and the threshold value Va2, by transmitting a signal to the power transmission device by turning on and off the transistor with a modulation pattern based on a different digital signal.

5. The power reception device according to claim 1, wherein the parallel capacitor is configured of parasitic capacitance of the transistor.

6. The power reception device according to claim 1, wherein
   the transistor includes a parasitic diode in parallel, and
   the rectifier circuit executes a synchronous rectification operation using the transistor element and adjusts the reception power.

7. The power reception device according to claim 1, wherein
   the controller forms a hysteresis between the operation execution and stoppage of the rectifier circuit.

8. The power reception device according to claim 1, wherein
   the controller includes a Zener diode, and controls the operation of the transistor element depending on a state of whether or not the output voltage detected by the voltage detection circuit exceeds a Zener voltage.

9. The power reception device according to claim 1, further comprising
   an input capacitor connected to a control terminal of the transistor, the input capacitor having a capacitance value smaller than a capacitance value of the smoothing capacitor and larger than a capacitance value of the parallel capacitor or the equivalent resonance capacitor.

10. A power transmission device comprising:
    a power transmission coil configured to couple with a power reception coil included in the power reception device according to claim 3; and
    an oscillation circuit including a transistor electrically connected to the power transmission coil and configured to generate a high frequency AC current flowing in the power transmission coil,
    wherein transmission power is adjusted by demodulating a modulation pattern based on a digital signal transmitted from the power reception device.

11. The power reception device according to claim 2, wherein
    the controller transmits, in a case where the voltage detected by the voltage detection circuit is higher than the threshold value Va1 and lower than the threshold value Va2, a signal to the power transmission device by turning on and off the transistor element with a modulation pattern based on a digital signal transmitted to the power transmission device, and adjusts the reception power by changing transmission power of the power transmission device.

12. The power reception device according to claim 2, wherein the parallel capacitor is configured of parasitic capacitance of the transistor.

13. The power reception device according to claim 3, wherein the parallel capacitor is configured of parasitic capacitance of the transistor.

14. The power reception device according to claim 2, wherein
the transistor includes a parasitic diode in parallel, and
the rectifier circuit executes a synchronous rectification operation using the transistor element and adjusts the reception power.

15. The power reception device according to claim 3, wherein
the transistor includes a parasitic diode in parallel, and
the rectifier circuit executes a synchronous rectification operation using the transistor element and adjusts the reception power.

16. The power reception device according to claim 2, wherein
the controller forms a hysteresis between the operation execution and stoppage of the rectifier circuit.

17. The power reception device according to claim 3, wherein
the controller forms a hysteresis between the operation execution and stoppage of the rectifier circuit.

18. The power reception device according to claim 2, wherein
the controller includes a Zener diode, and controls the operation of the transistor element depending on a state of whether or not the output voltage detected by the voltage detection circuit exceeds a Zener voltage.

19. The power reception device according to claim 2, further comprising
an input capacitor connected to a control terminal of the transistor, the input capacitor having a capacitance value smaller than a capacitance value of the smoothing capacitor and larger than a capacitance value of the parallel capacitor or the equivalent resonance capacitor.

20. A power transmission device comprising:
a power transmission coil configured to couple with a power reception coil included in the power reception device according to claim 4; and
an oscillation circuit including a transistor electrically connected to the power transmission coil and configured to generate a high frequency AC current flowing in the power transmission coil,
wherein transmission power is adjusted by demodulating a modulation pattern based on a digital signal transmitted from the power reception device.

* * * * *